United States Patent [19]

Roberts

[11] 3,870,530
[45] Mar. 11, 1975

[54] CATALYTIC AMORPHOUS GLASS FIBERS

[75] Inventor: Gordon J. Roberts, Shaker Heights, Ohio

[73] Assignee: Ferro Corporation, Cleveland, Ohio

[22] Filed: Aug. 9, 1972

[21] Appl. No.: 279,211

[52] U.S. Cl.............. 106/50, 106/48, 252/476, 252/462, 252/432, 252/455 R, 252/471, 252/467, 252/474
[51] Int. Cl. ..... C03c 13/00, B01j 11/32, B01j 11/22
[58] Field of Search............ 106/48 C, 50, 48; 252/477 R, 476, 474, 454, 432, 455 R, 471, 467, 462

[56] References Cited
UNITED STATES PATENTS

| | | | |
|---|---|---|---|
| 3,109,511 | 11/1963 | Slayter et al. | 106/48 |
| 3,266,477 | 8/1966 | Stiles | 106/48 |
| 3,450,523 | 8/1969 | Stiles et al. | 106/48 |
| 3,468,646 | 9/1969 | Finn et al. | 106/48 |
| 3,484,259 | 12/1969 | Lewis et al. | 106/48 |
| 3,495,950 | 2/1970 | Barber et al. | 252/477 |
| 3,547,098 | 12/1970 | Lea | 106/48 |
| 3,562,184 | 2/1971 | Dodd et al. | 106/48 |
| 3,632,709 | 1/1972 | Hayes et al. | 252/477 |
| 3,642,894 | 2/1972 | Habermann et al. | 252/476 |
| 3,663,457 | 5/1972 | Tamura et al. | 252/476 |
| 3,671,278 | 6/1972 | Borowski | 106/48 |
| 3,697,447 | 10/1972 | Bettinardi | 252/477 |
| 3,718,498 | 2/1973 | Denny et al. | 106/48 |
| 3,748,171 | 7/1973 | Peeling | 106/48 |

Primary Examiner—Winston A. Douglas
Assistant Examiner—Mark Bell
Attorney, Agent, or Firm—Milton L. Simmons; Wesley B. Taylor

[57] ABSTRACT

Catalytic, amorphous glass in highly divided form, such as fibers, is disclosed in which the glass is substantially non-crystalline and contains from about 10% to about 70% by weight of an essentially binary system comprising at least 5% by weight of the glass of CuO and the balance of a metal oxide selected from the group consisting of $MnO_2$, $Cr_2O_3$, $Fe_2O_3$, CoO, NiO, $V_2O_5$, $La_2O_3$, $CeO_2$, $ZrO_2$, and mixtures thereof. Where used, the fibers are prepared by fiberizing such a glass composition and then cooling the resulting glass fibers at a sufficiently fast rate to obtain little or no crystallinity. Optionally, the amorphous glass composition may be used as a powder.

10 Claims, 2 Drawing Figures

WEIGHT PERCENT COMPOSITIONS OF CERTAIN CATALYTIC OXIDE MIXTURES IN THE CuO-MnO$_2$-Cr$_2$O$_3$ SYSTEM.

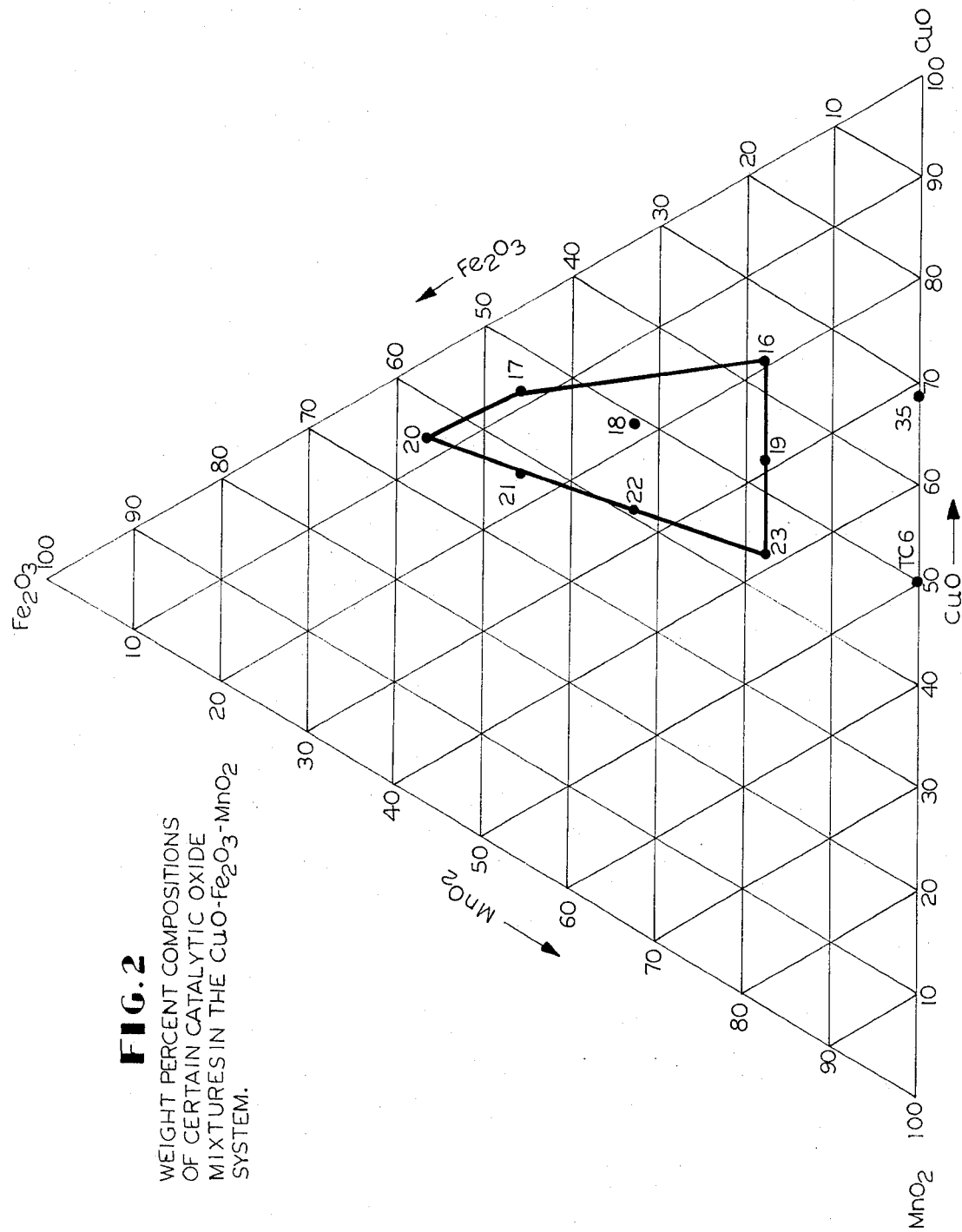

CATALYTIC AMORPHOUS GLASS FIBERS

BACKGROUND OF THE INVENTION

A porcelain enamel frit containing an oxidation-inducing metal oxide, such as cobalt oxide, has been suggested, for example, in U.S. Pat. No. 3,547,098 to Lee. Such frit may be used as a porcelain enamel coating for oven liners, or the like, where its ability when heated to oxidize foreign matter such as oven soils converts the oven to a desired self-cleaning type. Still other applications for the frit are possible, such as in forming vitreous coatings for exhaust systems of paint-baking ovens or automotive exhaust systems, the interiors of which can be coated with enamel from the frit to render passing gases less noxious and objectionable prior to their discharge from the systems by oxidizing the gases.

Although the present invention is not to be bound by theory, it is generally accepted that for a certain material to have a catalytic effect, such as in oxidation-inducing, the material must have active sites of potentially high chemical activity. To one skilled in the art, this means a crystalline structure in which atoms of materials are arranged in preordained fashion. According to one view, catalysts operate effectively because certain ions in the crystal lattice are not completely coordinated within the nucleus of the crystal, that is, such ions lie on a "corner" or "edge" of the crystal. Indeed, conventional oxide catalysts are microcrystalline solids. As a rule of thumb, the smaller the crystallite size of such oxide catalysts, the more active it is. If a catalyst is exposed to excessive heat during its useful life, the crystallite size increases and the catalytic activity decreases.

The use of glass fibers which are well known to be amorphous and noncrystalline would not, therefore, be expected to be useful for catalytic, oxidation-inducing activity. Nor would amorphous glass in other forms, such as a powder, be expected to be catalytically active. In a copending application, filed in the names of Walter H. Brueggeman and Jack S. Gilhart on Aug. 9, 1972, entitled "Catalytic Crystalline Glass Fibers," Ser. No. 279,210, and assigned to the assignee of this application, amorphous glass fibers containing an oxidation-inducing oxide are made catalytic by heat treating the glass fibers to convert them into a crystalline form. In accordance with the present invention, amorphous glass in highly divided form, such as glass fibers, is provided which is always amorphous, need not be crystallized, and yet is capable of catalytic, oxidation-inducing activity.

SUMMARY OF THE INVENTION

The present invention resides in using a base glass composition of substantially inert, glass-forming materials containing from about 10% to about 70% by weight of an essentially binary metal oxide system and converting the molten composition to a highly divided form, such as by fiberizing and cooling the fibers at a sufficiently fast rate to avoid substantial crystallization. The resulting glass fibers are used in the amorphous form and are found to have good catalytic, oxidation-inducing effect on combustible materials. Alternatively the glass compositions may be used as a powder.

The essentially binary metal oxide system comprises at least 5% by weight of the glass composition of CuO and the balance of the 10% to 70% fraction of a metal oxide selected from the group consisting of $MnO_2$, $Cr_2O_3$, $Fe_2O_3$, CoO, NiO, $V_2O_5$, $La_2O_3$, $CeO_2$, $ZrO_2$, and mixtures thereof. In the preferred practice, a substantially ternary system is employed, such as in weight percent from about 25% to about 80% of CuO, from about 25% to about 62% of $MnO_2$, and up to 50% of an adjuvant oxide which may be any one or more of the remaining oxides listed, preferably $Cr_2O_3$ or $Fe_2O_3$. The metal oxides are mixed with the base glass composition and fiberized by known conventional means as long as the fibers are rapidly chilled to avoid substantial crystallization. A powder may be formed by grinding the fibers.

The glass fibers may be used in any convenient manner, such as in batt, mat, or glass wool form, and mounted in a given installation as to be exposed to material of which at least partial oxidation is to be made. The high surface area of the glass fibers considerably improves intimate contact between such material and the catalytic fibers to promote combustion or other chemical changes. The fibers effectively supply oxygen when combustible materials contact them, while oxygen from the atmosphere is absorbed by the fibers and, it is theorized, stored or diffused throughout the body of the glass fiber. In this manner, sufficient excess oxygen is available to promote oxidation as desired when the fibers are subsequently heated to an oxidizing temperature. This oxidation absorption phenomenon seems to occur at about the same temperature as needed for oxidation of combustible material contacting the glass fiber surface. The powder form of the present glass compositions may be used as such or placed on a conventional carrier such as of alumina.

It is theorized that when a present glass composition is, for example, fiberized and rapidly chilled, the resultant solid vitreous or amorphous material still possesses a disorganized, liquid-like molecular structure. It is postulated that the theoretically desirable coordination requirements of the metal ions on the surface of the glass fibers have not been satisfied. This may leave defects similar to crystalline structural defects which define adsorptive sites capable of catalytic activity. The increased surface area afforded by a powder or fiber is also thought to be contributory.

BRIEF DESCRIPTION OF THE DRAWING

In the accompanying drawing:

FIG. 2 is a three-component composition diagram of another desirable metal oxide ternary system for use in the present invention. In both figures, the numbers refer to the corresponding example numbers in Tables I and IV.

DESCRIPTION OF THE PREFERRED EMBODIMENTS

Figure 1:
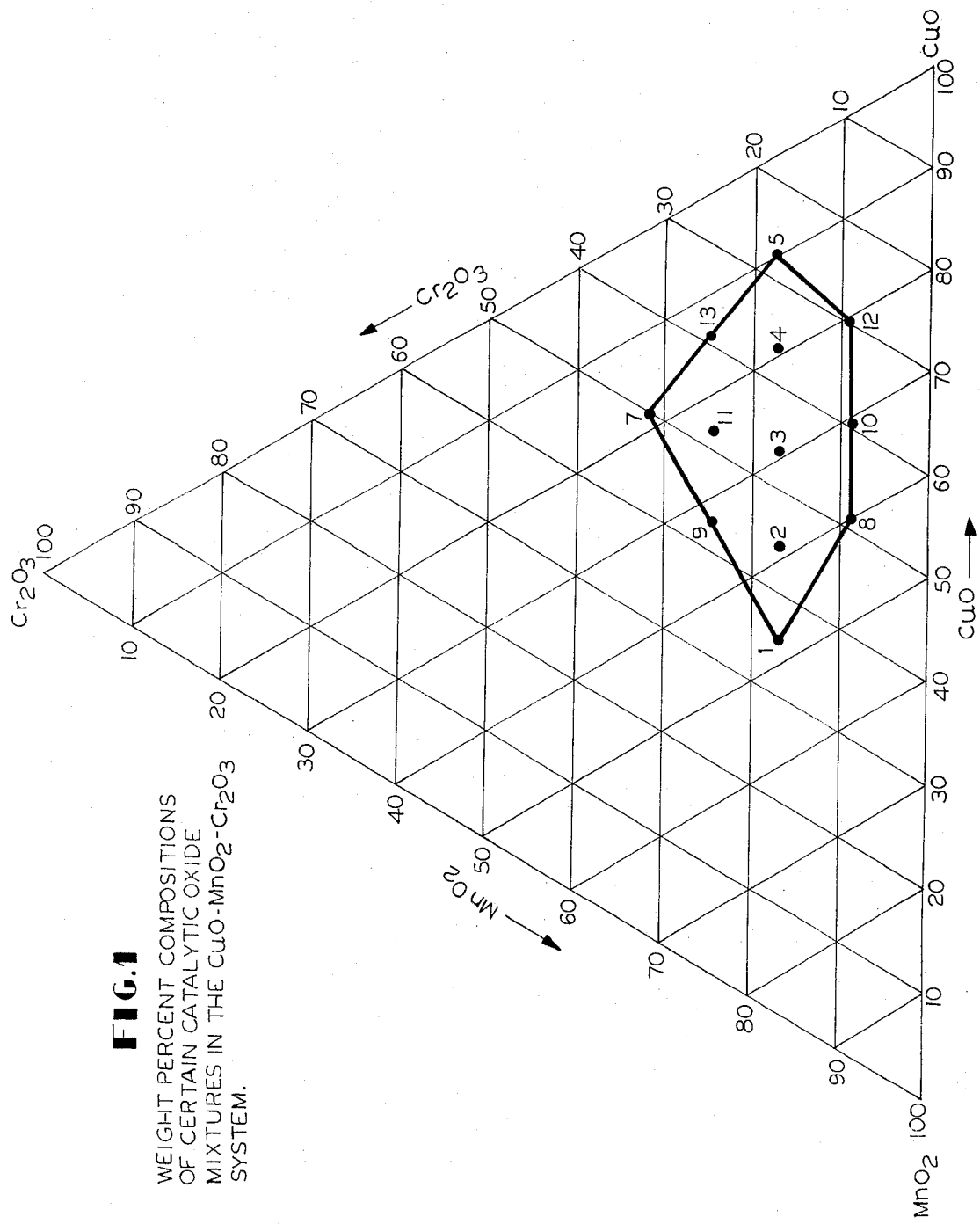
FIG. 1 is a three-component composition diagram of one desirable metal oxide ternary system for use in the present glass composition.

As used herein, the term "base glass" means the glass composition used in conjunction with an oxidation-inducing metal oxide system as more fully described hereinafter. As such, the base glass merely serves as a vehicle in which to dissolve and transport a binary oxide system and therefore may comprise any generally known glass-forming materials, usually other oxides. When fibers are to be prepared, the base glass should have a fusibility and other physical characteristics as to be fiberized by standard known means. However, changes and adjustments in the base glass may be made in order better to adapt the glass fibers for their intended application, for example, to increase resistance to water solubility, acid leaching, and the like.

By way of example, the following glasses may be used as the base glass composition:

1. A porcelain enamel-type glass compounded, for instance, from borax, soda ash, potassium carbonate, silica, and titania.
2. A modified porcelain enamel-type glass of higher durability to water vapor, such as the first mentioned glass plus calcium carbonate, ziron, and alumina hydrate as additional ingredients.
3. An alkali-free glass embodying the $CaO$-$Al_2O_3$-$SiO_2$ system.
4. Alkali-free magnesium aluminosilicate glasses.

The binary metal oxide system is characterized herein as "essentially" binary, since it must comprise copper oxide and a second adjuvant metal oxide which may be one of several oxides or mixtures thereof. For example, the adjuvant oxide may be $MnO_2$, $Cr_2O_3$, $Fe_2O_3$, $CoO$, $NiO$, $V_2O_5$, $La_2O_3$, $CeO_2$, $ZrO_2$, or mixtures of two or more of such oxides. The metal oxide system is added to the base glass composition so as to comprise from about 10% to about 70%, by weight of the total.

There are preferred binary and ternary oxide systems. For example a preferred binary system itself comprises in weight percent about:

|  | Percent |
| --- | --- |
| CuO | 25 to 80 |
| MnO$_2$ | 20 to 75 |

Ternary systems preferably include the following in weight percent:

|  | Percent |
| --- | --- |
| CuO | 25 to 80 |
| MnO$_2$ | 20 to 75 |
| Adjuvant Oxide | 0 to 55 |

The adjuvant oxide may be any one or more of the remaining metal oxides previously mentioned. The preferred adjuvant oxides are chromic oxide and ferric oxide. The preferred weight percent composition of systems containing these oxides are as third oxide are:

|  | Percent |
| --- | --- |
| CuO | 35 to 80 |
| MnO$_2$ | 10 to 55 |
| Cr$_2$O$_3$ | 10 to 32 |
| CuO | 30 to 70 |
| MnO$_2$ | 8 to 42 |
| Fe$_2$O$_3$ | 19 to 60 |

Highly desirable ternary metal oxide systems include in weight percent 63% $CuO$, 17% $Cr_2O_3$, and 20% $MnO_2$; and 46% $CuO$, 9% $MnO_2$, and 45% $Fe_2O_3$. In the foregoing systems expressed in percentage, it is understood that sufficient amounts of the indicated oxides are present to total 100%.

The total glass compositions, that is, base glass plus metal oxide system, may be prepared in any desired manner, as by admixing the components while in a dry state. The particle sizes of the oxides are not critical, since the entire mass is eventually melted. The melting is followed by fiberization which may be carried out by conventional, known equipment, such as by enveloping a fine molten stream of the glass in a blast of air and attenuating the stream into fine, usually discontinuous fibers which are collected on a screen in interlaced mat or batt form. It is not necessary to use a binder for the fibers, but if one is applied it must be resistant to the temperatures at which the mat or batt will be used in practice. The size of the fibers is dictated more by their particular eventual application, rather than the fiberizing technique employed. Glass fibers of standard dimensions are satisfactory. In general, the fibers can be of any reasonable length and preferably have at least a sufficiently small diameter to render the fibers flexible. As glass compositions of the present invention are fiberized, the fibers must be cooled or chilled sufficiently fast to avoid crystallization and to preserve the desired (for the present compositions) amorphous state. It is possible to tolerate some crystallization without losing the advantages of the present invention. Indeed, it may be virtually impossible or impractical to avoid incipient crystallization. Crystallization up to at least 10% of the mass can be tolerated without serious loss of catalytic activity. Normally, crystallization is less than 5% of the mass.

After the glass composition is fiberized and the fibers chilled and collected in a desired physical form, they may be installed as desired in any environment in which at least partial oxidation of a combustible material is desired. For example, a body of fibers may be installed along one or more walls of an oven to oxidize oven soils. Or a mat of the present glass fibers may line an automotive muffler or other chamber in an automotive exhaust system to oxidize gases, such as carbon monoxide to carbon dioxide. Generally, little or no effective oxidation can be achieved below a temperature of about 350°F., while the upper temperature limit of oxidation utilizing the present glass fibers is in the vicinity of about 700°F.

The present catalytic amorphous glass compositions should be in sufficiently highly divided form as to have a surface area exceeding 0.2 square meter per gram. In addition to the fibrous form previously described, the amorphous compositions can be in powder form. The particle sizes are not critical as long as the mentioned minimum surface area is present. The powder may be obtained by any known means, for example, by grinding the amorphous fibers.

The powder may be used as such or by conventionally placing the powder on inert carriers, such as by pelletizing mixtures of the present pulverulent amorphous glass compositions and particles of aluminia, silica, magnesia, titania, zirconia, calcium sulfate, or the like.

The following examples are intended to illustrate the invention and should not be construed as imposing limitations on the claims.

EXAMPLES 1 THROUGH 14

Table I lists 14 different batch weights (parts by weight) glass compositions of the present invention embodying a base glass as designated by the first five listed ingredients, a binary system of $CuO$ - $MnO_2$ and a ternary metal oxide system of $MnO_2$-$CuO$-$Cr_2O_3$. The base glass was the same in each case to provide a basis of comparison, the relative amounts of the oxide systems being varied. The base glass comprised 50 mole percent of the finished composition, the oxides accounting for the other 50 mole percent. After melting, the base glass of the melt contained in mole percent: 4.8% of $Na_2O$; 4.5% of $K_2O$, 2.8% of $B_2O_3$, 28.0% of $SiO_2$, and 9.9% of $TiO_2$.

After a particular glass composition was melted, the melt was fiberized by directing a molten glass stream of the melt axially through a metal venturi supplied with compressed air through an annular slit in the throat section of the venturi. The air was exhausted into a wooden box collector having screens of 1/16th-inch mesh on which to collect the fibers. The air pressure used was in the range of about 100 to 150 p.s.i.

To test amorphous fibers of the present invention, a conventional vitreous, silica tubular reactor was used with provision for sampling a gas mixture both before and after passage through a catalyst bed comprising the fibers under test stationed within the reactor. The internal diameter of the reactor tube was 0.75 inch. A chromel-alumel thermocouple was placed axially into the tubular reactor to a point centrally of the proposed glass fiber bed and used both as a catalyst support and as the temperature sensor. The amorphous catalytic fibers were then introduced and gently tapped down and around the thermocouple end until a bed was formed extending one inch along the reactor. A standard test weight of about two grams of fibers was used. Plugs of silica wool were placed on each end of the amorphous fibers under test, serving both to keep the catalyst bed in place and to act as a gas preheater. The packed tube was then mounted in a suitable furnace whose temperature could be controlled as desired.

A gas mixture was then passed into the tubular reactor and through the catalyst bed. A fine needle valve in a gas mixture entrance line and a rotameter were used to adjust the flow of the gas mixture to a desired rate measured in liters per minute.

Three gas mixtures used were composed as follows:
a. 1% CO, 3.75% air, remainder nitrogen;
b. 1% ethylene, 22.5% air, remainder nitrogen; and
c. 0.25% ethylene, 5.6% air, remainder nitrogen.

In each case the amount of air present was 50% in excess of that needed for complete combustion of the combustible component. Samples of the inlet and exhaust gases were withdrawn from the apparatus periodically by means of a valve system and subjected to analysis by gas chromatography. The reduction in amount of the combustible component in the exhaust was used to calculate the percentage of that component oxidized by a single pass through the catalytic fibrous bed.

TABLE I

Glass batch compositions based on the $CuO$-$MnO_2$ and $MnO_2$-$CuO$-$Cr_2O_3$ Catalyst Systems

[Parts by weight]

| Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Borax | 14.4 | 14.4 | 14.4 | 14.4 | 14.4 | 14.4 | 14.4 | 14.4 | 14.4 | 14.4 | 14.4 | 14.4 | 14.4 | 14.4 |
| Soda ash | 18.0 | 18.0 | 18.0 | 18.0 | 18.0 | 18.0 | 18.0 | 18.0 | 18.0 | 18.0 | 18.0 | 18.0 | 18.0 | 18.0 |
| Potassium carbonate | 31.25 | 31.25 | 31.25 | 31.25 | 31.25 | 31.25 | 31.25 | 31.25 | 31.25 | 31.25 | 31.25 | 31.25 | 31.25 | 31.25 |
| Silica | 84.0 | 84.0 | 84.0 | 84.0 | 84.0 | 84.0 | 84.0 | 84.0 | 84.0 | 84.0 | 84.0 | 84.0 | 84.0 | 84.0 |
| Titania | 39.6 | 39.6 | 39.6 | 39.6 | 39.6 | 39.6 | 39.6 | 39.6 | 39.6 | 39.6 | 39.6 | 39.6 | 39.6 | 39.6 |
| $Cr_2O_3$ | 19.0 | 19.0 | 19.0 | 19.0 | 19.0 | 38.0 | 38.0 | 9.5 | 28.5 | 9.5 | 28.5 | 9.5 | 28.5 | |
| CuO | 40.0 | 50.0 | 60.0 | 70.0 | 80.0 | 70.0 | 60.0 | 55.0 | 50.0 | 65.0 | 60.0 | 75.0 | 70.0 | 70.0 |
| $MnO_2$ | 54.25 | 43.0 | 32.5 | 21.75 | 10.9 | 11.0 | 22.0 | 43.0 | 37.6 | 32.5 | 27.1 | 21.75 | 16.3 | 32.5 |

Table II lists the percentage results on oxidizing carbon monoxide by amorphous glass fibers prepared from the compositions of Examples 1 through 4 of Table I. Table III lists the percentage results of oxidizing ethylene (1% ethylene mixture) by many of the same examples of Table I as indicated. FIG. 1 illustrates a ternary composition area, delineated by the examples of Table I having ternary metal oxide systems, which was found to have good catalytic activity even though the glass was in the form of amorphous glass fibers.

Glass compositions of Example 4 was found to have an excellent catalytic activity.

EXAMPLES 15 THROUGH 26

Table IV lists 12 different batch weight (parts by weight) glass compositions of the present invention embodying a base glass and a ternary metal oxide system of $MnO_2$-$CuO$-$Fe_2O_3$.

Glass fibers were prepared and tested from these glass compositions in the same manner as described for Examples 1 through 14. Table V (1% ethylene mixture) lists the

TABLE II

Percentage Oxidation of Carbon Monoxide by Catalytic Amorphous Glass Fibers Based On $MnO_2$-$Cr_2O_3$-$CuO$ Catalyst System

| Temp. (°C) | Flow Rate (l. m⁻¹) | Example 1 | Example 2 | Example 3 | Example 4 |
|---|---|---|---|---|---|
| 250 | ½ | — | 21.2 | 49.1 | 40.4 |
| | 1 | — | — | 29.0 | 31.9 |
| | 2 | — | — | 25.8 | 20.7 |
| | 3 | — | — | 21.9 | 20.7 |
| 275 | ½ | 30 | 53.3 | 77.1 | 77.2 |
| | 1 | 12.7 | 32.6 | 58.1 | 53.5 |
| | 2 | 13.5 | 22.4 | 31.2 | 35.3 |
| | 3 | 11.9 | 17.0 | 31.6 | 34.2 |
| 300 | ½ | 69.9 | 79.1 | 100 | 98.5 |
| | 1 | 54.0 | 64.5 | 97.2 | 96.0 |
| | 2 | 32.0 | 44.0 | 82.0 | 76.4 |
| | 3 | 27.4 | 42.0 | 51.2 | 56.9 |
| 325 | ½ | 97.7 | 100.0 | 100.0 | 100.0 |
| | 1 | 92.7 | 95.6 | 100.0 | 100.0 |
| | 2 | 72.3 | 74.9 | 98.5 | 90.1 |
| | 3 | 51.6 | 56.4 | 89.0 | 75.9 |
| 350 | ½ | 100.0 | 100.0 | 100.0 | 100.0 |
| | 1 | 100.0 | 100.0 | 100.0 | 100.0 |
| | 2 | 90.5 | 88.0 | 100.0 | 96.5 |
| | 3 | 67.2 | 71.4 | 98.5 | 88.7 |

TABLE III

Percentage Oxidation of Ethylene by Catalytic Amorphous Glass Fibers Based on $MnO_2$-$CuO$-$Cr_2O_3$ Catalyst System Example Number

| Temperature (°C) | Flow Rate (l. m$^{-1}$) | 1 | 2 | 3 | 4 | 5 | 7 | 8 | 10 | 12 | 13 | 14 |
|---|---|---|---|---|---|---|---|---|---|---|---|---|
| 325 | ½ | — | — | 6.1 | 3.2 | 1.5 | 1.3 | 2.1 | 7.0 | 5.9 | 5.7 | 5.4 |
|  | 1 | 2.3 | — | 0.9 | 2.3 | — | — | — | 4.5 | 3.2 | 1.7 | — |
|  | 2 | — | — | — | — | — | — | — | — | — | — | — |
|  | 3 | — | — | — | — | — | — | — | — | — | — | — |
| 350 | ½ | 11.3 | 2.6 | 9.4 | 13.2 | 6.6 | 1.8 | 6.4 | 16.7 | 21.0 | 10.0 | 15.5 |
|  | 1 | 5.2 | — | 7.6 | 8.9 | 3.2 | — | 1.2 | 10.4 | 11.9 | 4.0 | 6.0 |
|  | 2 | 3.1 | — | — | 2.3 | — | — | — | 3.7 | 7.4 | 2.9 | 4.2 |
|  | 3 | 3.1 | — | — | 1.5 | — | — | — | 2.2 | 5.5 | 1.1 | 1.0 |
| 375 | ½ | 18.2 | 6.6 | 19.2 | 27.1 | 12.9 | 5.3 | 13.4 | 28.4 | 31.1 | 17.3 | 26.5 |
|  | 1 | 12.7 | 2.7 | 12.5 | 16.0 | 7.3 | 2.2 | 5.6 | 15.1 | 17.1 | 6.4 | 12.8 |
|  | 2 | 7.6 | 1.6 | 7.7 | 7.2 | 1.4 | — | 1.7 | 5.5 | 10.2 | 3.8 | 5.5 |
|  | 3 | 6.2 | — | 6.6 | 5.9 | 0.7 | — | 0.6 | 4.5 | 7.3 | 1.7 | 2.2 |
| 400 | ½ | 19.7 | 10.2 | 26.2 | 44.2 | 21.1 | 10.3 | 23.4 | 40.4 | 42.6 | 26.2 | 40.6 |
|  | 1 | 10.9 | 5.4 | 18.5 | 23.4 | 10.6 | 9.7 | 9.2 | 22.4 | 23.8 | 11.4 | 22.5 |
|  | 2 | 6.1 | 2.6 | 10.6 | 12.0 | 4.3 | — | 6.4 | 10.8 | 15.1 | 5.8 | 10.5 |
|  | 3 | 4.7 | — | 7.0 | 8.1 | 3.9 | — | 2.7 | 5.7 | 10.1 | 2.4 | 4.5 |
| 425 | ½ | 24.0 | 14.9 | 33.6 | 57.2 | 34.2 | 12.5 | 22.1 | 45.0 | 50.5 | 37.1 | 56.9 |
|  | 1 | 11.5 | 6.5 | 22.9 | 34.3 | 16.6 | 5.8 | 9.0 | 22.7 | 28.5 | 18.7 | 29.1 |
|  | 2 | 5.6 | 2.1 | 10.8 | 17.1 | 6.3 | 1.7 | 6.3 | 13.5 | 17.2 | 8.9 | 11.4 |
|  | 3 | 4.0 | — | 9.4 | 11.3 | 3.3 | — | 1.9 | 6.0 | 13.9 | 6.1 | 6.9 |
| 450 | ½ | 17.9 | 14.8 | 46.8 | 69.6 | 34.2 | 14.5 | 23.0 | 52.0 | 63.8 | 41.0 | 68.5 |
|  | 1 | 6.7 | 8.9 | 28.9 | 39.8 | 16.9 | — | — | 28.2 | 33.4 | 20.7 | 32.8 |
|  | 2 | — | 2.7 | 13.4 | 20.5 | 8.4 | — | — | 13.7 | 19.3 | 9.7 | 14.6 |
|  | 3 | — | — | 12.4 | — | 6.1 | — | — | 7.6 | 13.9 | 7.1 | 7.7 |
| 475 | ½ | — | — | 48.4 | 75.7 | 33.8 | — | — | 52.8 | 62.1 | 41.3 | 64.6 |
|  | 1 | — | — | — | — | — | — | — | 25.2 | 31.5 | — | — |
|  | 2 | — | — | — | — | — | — | — | — | — | — | — |
|  | 3 | — | — | — | — | — | — | — | — | — | — | — |

TABLE IV

Glass Batch Compositions Based on $MO_2$-$CuO$-$FeO_3$ Systems
(Parts By Weight)

Example

|  | 15 | 16 | 17 | 18 | 19 | 20 | 21 | 22 | 23 | 24 | 25 | 26 |
|---|---|---|---|---|---|---|---|---|---|---|---|---|
| Silica | 90 | 78.3 | 78.3 | 78.3 | 78.3 | 78.3 | 78.3 | 78.3 | 78.3 | 86.4 | 86.4 | 86.4 |
| CaCO$_3$ | 62.25 | — | — | — | — | — | — | — | — | — | — | — |
| MgO | — | 36.25 | 36.25 | 36.25 | 36.25 | 36.25 | 36.25 | 36.25 | 36.25 | 14.4 | 43.2 | 21.6 |
| Alumina Hydrate | 30.0 | 45.1 | 45.1 | 45.1 | 45.1 | 45.1 | 45.1 | 45.1 | 45.1 | 66.0 | 44.0 | 55.0 |
| TiO$_2$ | 45.75 | 46.0 | 46.0 | 46.0 | 46.0 | 46.0 | 46.0 | 46.0 | 46.0 | 46.0 | 46.0 | 46.0 |
| CuO | 70.0 | 70.0 | 60.0 | 60.0 | 60.0 | 50.0 | 50.0 | 50.0 | 50.0 | 60.0 | 60.0 | 60.0 |
| MnO$_2$ | 21.75 | 21.75 | 11.0 | 22.0 | 33.0 | 11.0 | 22.0 | 33.0 | 44.0 | 11.0 | 11.0 | 11.0 |
| Fe$_2$O$_3$ | 20.0 | 20.0 | 60.0 | 40.0 | 20.0 | 80.0 | 60.0 | 40.0 | 20.0 | 60.0 | 60.0 | 60.0 |

TABLE V

Percentage oxidation of ethylene by alkali-free catalytic amorphous glass fibers based on $MnO_2$-$CuO$-$Fe_2O_3$ catalyst system Example

| Temperature (° C.) | Flow rate (l. m.$^{-1}$) | 15 | 16 | 17 | 18 | 19 | 20 | 21 | 22 | 23 | 24 | 25 | 26 |
|---|---|---|---|---|---|---|---|---|---|---|---|---|---|
| 300 | ½ | 14.9 | 35.9 | 39.2 | 42.2 | 30.7 | 35.7 | 27.4 | 35.3 | 23.6 | 74.5 | 53.2 | 61.2 |
|  | 1 | 8.1 | 18.9 | 21.7 | 24.6 | 15.4 | 20.5 | 17.4 | 21.5 | 15.2 | 50.2 | 32.0 | 32.6 |
|  | 2 |  |  |  |  |  |  |  |  |  | 30.4 | 21.2 | 16.3 |
|  | 3 |  |  |  |  |  |  |  |  |  | 17.5 | 14.2 | 11.6 |
| 325 | ½ | 26.8 | 56.8 | 66.9 | 74.7 | 54.4 | 55.1 | 48.0 | 61.0 | 43.1 | 95.3 | 84.2 | 82.1 |
|  | 1 | 13.8 | 32.0 | 46.8 | 40.6 | 32.2 | 35.2 | 30.3 | 40.3 | 26.0 | 79.2 | 59.7 | 56.5 |
|  | 2 | 8.0 | 15.7 | 24.4 | 24.2 | 14.2 | 25.0 |  |  |  | 58.4 | 37.9 | 34.4 |
|  | 3 | 7.5 |  | 19.1 | 16.7 | 11.3 |  |  |  |  | 41.9 | 27.5 | 26.5 |
| 350 | ½ | 44.2 | 83.9 | 91.9 | 91.2 | 78.5 | 78.6 | 74.0 | 85.3 | 59.6 |  | 97.6 | 98.0 |
|  | 1 | 20.6 | 56.8 | 70.0 | 70.2 | 51.9 | 52.7 | 47.1 | 60.6 | 39.3 | 96.7 | 86.0 | 80.0 |
|  | 2 | 10.5 | 28.0 | 38.7 | 37.6 | 30.3 | 36.3 | 28.8 | 37.6 | 28.3 | 81.5 | 60.2 | 55.4 |
|  | 3 | 11.4 | 22.0 | 31.6 | 24.6 | 17.4 | 26.3 |  | 31.8 | 27.1 | 61.8 | 43.5 | 49.3 |
| 375 | ½ | 81.8 | ~97 |  |  | 91.3 | 91.8 | 93.0 |  | 76.0 |  |  |  |
|  | 1 | 26.1 | 79.3 | 90.8 | 90.4 | 72.3 | 70.0 | 74.0 | 84.0 | 55.6 |  | 94.8 |  |
|  | 2 | 15.2 | 40.9 | 60.6 | 64.9 | 39.4 | 43.1 | 46.4 | 54.3 | 39.8 | 92.9 | 77.3 |  |
|  | 3 | 12.9 | 28.5 | 45.4 | 38.8 | 27.9 | 39.4 | 31.8 | 36.2 | 34.5 | 75.7 | 60.1 |  |
| 400 | ½ | 91.5 |  |  |  |  |  |  |  | 85.2 |  |  |  |
|  | 1 | 66.3 | ~97 |  |  | 91.0 | 82.6 | 90.3 |  | 65.2 |  |  |  |
|  | 2 | 18.2 | 69.9 | 82.7 | 81.4 | 54.9 | 57.0 | 57.2 | 71.9 | 48.5 |  | 91.2 |  |
|  | 3 | 16.9 | 40.4 | 56.9 | 51.6 | 36.2 | 45.8 | 41.8 | 53.4 | 37.4 | 91.3 | 75.9 |  |
| 425 | ½ |  |  |  |  |  |  |  |  |  |  |  |  |
|  | 1 | 81.7 |  |  |  |  | 85.1 |  |  |  |  |  |  |
|  | 2 | 24.4 | 83.0 | 96.3 | 92.0 | 66.5 | 66.5 | 74.0 |  |  |  |  |  |
|  | 3 | 18.8 | 50.8 | 74.4 | 68.2 | 51.0 | 46.8 | 53.6 |  |  |  |  |  |

TABLE V—Continued

Percentage oxidation of ethylene by alkali-free catalytic amorphous glass fibers based on $MnO_2$-$CuO$-$Fe_2O_3$ catalyst system

| Temperature (°C.) | Flow rate (l. m.$^{-1}$) | Example | | | | | | | | | | | |
|---|---|---|---|---|---|---|---|---|---|---|---|---|
| | | 15 | 16 | 17 | 18 | 19 | 20 | 21 | 22 | 23 | 24 | 25 | 26 |
| 450 | ½ | | | | | | | | | | | | |
| | 1 | 85.6 | | | | | | | | | | | |
| | 2 | 29.4 | 91.6 | | | 79.5 | 75.6 | 83.6 | | | | | |
| | 3 | 23.3 | 62.3 | 91.4 | 78.9 | 55.9 | 60.1 | 63.4 | | | | | |
| 475 | ½ | | | | | | | | | | | | |
| | 1 | 88.8 | | | | | | | | | | | |
| | 2 | 37.5 | | | | | 81.0 | | | | | | |
| | 3 | 28.1 | 72.6 | | 88.6 | 54.3 | | | | | | | |
| 500 | ½ | | | | | | | | | | | | |
| | 1 | | | | | | | | | | | | |
| | 2 | 73.3 | | | | | 83.6 | | | | | | |
| | 3 | | | | | | | | | | | | |

NOTE.—Example 15 was tested with a 1% $C_2H_4$ gas mixture, giving rise to temperature stability problems in the catalyst bed; the reported results are low. All subsequent examples were tested with a ¼% $C_2H_4$ mixture.

percentage results of oxidizing ethylene by many of the examples of Table IV. FIG. 2 illustrates a ternary composition area delineated by Examples 16 through 23 which was found to have good catalytic activity, even though as part of amorphous glass fibers. Glass compositions of Examples 17 and 18 were found to have excellent catalytic activity.

EXAMPLES 27 THROUGH 31

These examples illustrate the use of quaternary metal oxide systems. Table VI lists five different smelted glass compositions of the present invention embodying a base glass and a quaternary metal oxide system of zirconia, copper oxide, manganese dioxide, and an additional oxide selected from one of five, namely, $Cr_2O_3$, $Fe_2O_3$, $V_2O_5$, CoO, and NiO. The base glass is the same in each instance as represented by the first seven listed ingredients.

Glass fibers were prepared and tested from the glass compositions of Table VI in the same manner as previously described. Table VII lists the percentage results of oxidizing ethylene by the compositions of Examples 27 through 31.

EXAMPLE 32

The following is a further example of a binary oxide system in a base glass composition:

| Ingredient | Batch (Parts by Weight) | Melt (Weight %) |
|---|---|---|
| Silica | 86.4 | 27.0 |
| Magnesia | 14.4 | 4.5 |
| Alumina hydrate | 66.0 | 13.5 (as $Al_2O_3$) |
| Titania | 46.0 | 14.4 |
| Copper Oxide | 70.0 | 21.9 |
| Ferric oxide | 60.0 | 18.7 |
| | | 100.0 |

The binary system comprised 53.9 weight percent of CuO and 46.1 weight percent of $Fe_2O_3$. Fibers prepared from the melt were tested under conditions

Table VI

Smelted Glass Compositions Based On Metal Oxide Quaternary Systems

| Example | 27 | 28 | 29 | 30 | 31 |
|---|---|---|---|---|---|
| $Na_2O$ | 4.86 | 4.85 | 4.80 | 5.03 | 5.03 |
| $K_2O$ | 6.50 | 6.48 | 6.42 | 6.73 | 6.73 |
| CaO | 1.96 | 1.95 | 1.93 | 2.02 | 2.02 |
| $B_2O_3$ | 3.04 | 3.03 | 3.00 | 3.14 | 3.14 |
| $Al_2O_3$ | 3.57 | 3.56 | 3.52 | 3.69 | 3.69 |
| $SiO_2$ | 27.30 | 27.20 | 26.90 | 28.21 | 28.21 |
| $TiO_2$ | 9.79 | 9.76 | 9.65 | 10.14 | 10.14 |
| $ZrO_2$ | 4.27 | 4.25 | 4.21 | 4.42 | 4.42 |
| CuO | 24.50 | 24.38 | 24.12 | 25.28 | 25.28 |
| $MnO_2$ | 7.61 | 7.60 | 7.51 | 7.89 | 7.89 |
| $Cr_2O_3$ | 6.64 | | | | |
| $Fe_2O_3$ | | 6.97 | | | |
| $V_2O_5$ | | | 7.85 | | |
| CoO | | | | 3.40 | |
| NiO | | | | | 3.40 |
| % Catalytic Oxides | 43.02 | 43.20 | 43.69 | 40.99 | 40.99 |

TABLE VII

Percentage Oxidation of Ethylene by Catalytic Amorphous Glass Fibers Having Compositions from Table VI

| Temp. (°C) | Flow Rate (l.m$^{-1}$) | Example | | | | |
|---|---|---|---|---|---|---|
| | | 27 | 28 | 29 | 30 | 31 |
| 325 | ½ | 1.0 | 10.0 | 14.3 | 9.8 | 14.4 |
| | 1 | — | 3.4 | — | 5.4 | 10.2 |
| | 2 | — | — | — | — | — |
| | 3 | — | — | — | — | — |
| 350 | ½ | 4.5 | 18.7 | 25.2 | 26.3 | 31.0 |
| | 1 | — | 8.7 | 10.8 | 13.5 | 19.8 |
| | 2 | — | 4.6 | 6.7 | 6.9 | 8.8 |
| | 3 | — | 3.2 | 5.3 | 5.4 | 6.3 |
| 375 | ½ | 8.5 | 29.4 | 41.7 | 41.7 | 54.5 |
| | 1 | — | 14.4 | 16.7 | 25.4 | 41.0 |
| | 2 | — | 8.2 | 9.2 | 11.3 | 14.7 |
| | 3 | — | 6.5 | 5.5 | 9.2 | 9.6 |
| 400 | ½ | 11.5 | 46.8 | 55.5 | 62.8 | 79.8 |
| | 1 | — | 23.1 | 24.5 | 42.1 | 64.0 |
| | 2 | — | 12.3 | 10.8 | 17.6 | 28.8 |
| | 3 | — | 8.3 | 7.6 | 12.2 | 12.8 |
| 425 | ½ | 14.1 | 79.4 | 64.6 | 79.5 | 91.0 |
| | 1 | — | 47.5 | 33.4 | 55.6 | 74.9 |
| | 2 | — | 17.8 | 12.3 | 21.8 | 37.8 |
| | 3 | — | 11.1 | 9.7 | 12.4 | 16.2 |
| 450 | ½ | 16.1 | 88.4 | 64.5 | 84.0 | — |
| | 1 | — | 61.0 | 33.3 | 62.1 | 82.7 |
| | 2 | — | 20.1 | 14.2 | 27.8 | 38.7 |
| | 3 | — | 14.4 | 10.0 | 14.8 | 18.9 |
| 475 | ½ | 12.8 | 93.4 | — | 85.2 | — |
| | 1 | — | 66.5 | — | 59.4 | — |
| | 2 | — | 25.4 | — | — | 60.3 |
| | 3 | — | 16.5 | — | — | 27.4 | previously described and had the following percentage oxidation of ethylene at the indicated temperatures when the ethylene-air mixture was passed through a fibrous catalytic bed at a rate of one liter per minute.

| | Percent |
|---|---|
| 325°C | 11.2 |
| 350°C | 33.1 |
| 375°C | 41.8 |
| 400°C | 70.1 |

EXAMPLES 33 THROUGH 37

Table VIII lists batch recipes (parts by weight) for preparing present glass compositions having still other multi-oxide catalytic systems in an amorphous matrix.

TABLE VIII

| Example | Glass Batch Compositions (Parts By Weight) | | | | |
|---|---|---|---|---|---|
| | 33 | 34 | 35 | 36 | 37 |
| Silica | 86.4 | 86.4 | 86.4 | 86.4 | 86.4 |
| Calcined Magnesite | 14.4 | 14.4 | 14.4 | 14.4 | 14.4 |
| Alumina Hydrate | 66.0 | 66.0 | 66.0 | 66.0 | 66.0 |
| Titania | 46.0 | 46.0 | 46.0 | 46.0 | 46.0 |
| Copper Oxide | 60.0 | 60.0 | 60.0 | 60.0 | 60.0 |
| Manganese Dioxide | 11.0 | 11.0 | — | 11.0 | — |
| Red Iron Oxide | — | 15.0 | 15.0 | 20.0 | 60.0 |
| Nickel Oxide | — | — | 11.0 | 30.0 | 10.0 |
| Cobalt Oxide | 60.0 | 45.0 | 45.0 | — | — |
| Lanthanum Oxide | — | — | — | 10.0 | 10.0 |
| Cerium Dioxide | — | 10.0 | — | — | — |

The compositions were smelted at about 1,475°C. The catalytic oxidation of fibers blown from these compositions was tested on ethylene-air mixtures using the techniques previously described. Table IX contains the results. The term "S.V." means "space velocity" and the value given indicates the number of volumes of gas under test (standard conditions) equal to the volume of catalyst that flows through the catalyst per hour.

TABLE IX

Percentage Oxidation of Ethylene by Fibers of Compositions of Table VIII

| Example | ½ l.m$^{-1}$ (S.V. = 3230 hr.$^{-1}$) | | | | 1 l.m$^{-1}$ (S.V. = 6460 hr.$^{-1}$) | | |
|---|---|---|---|---|---|---|---|
| | 300°C | 325°C | 350°C | 375°C | 375°C | 400°C | 425°C |
| 33 | 22.4 | 43.0 | 65.1 | — | 63.2 | 81.0 | 85.7 |
| 34 | 37.6 | 65.8 | — | — | 86.5 | 93.0 | — |
| 35 | 36.9 | 59.8 | — | — | 77.7 | 92.4 | — |
| 36 | 13.6 | 22.0 | 45.4 | 71.0 | — | 82.4 | 91.4 |
| 37 | 15.9 | 22.0 | 41.7 | 68.7 | 73.5 | 83.3 | 88.7 |

It is not clearly understood why the present amorphous glasses possess such catalytic activity as compared to a crystalline catalyst. If, as is generally accepted, one considers the presence of lattice defects in a crystalline catalyst to be largely responsible for its catalytic activity (as by offering strong absorption sites or by reducing nearby bond strengths), it is postulated that while amorphous materials can hardly be said to have lattice defects, yet there must be surface imperfections which act like a lattice defect of a crystalline catalyst. If a glass melt is quenched almost instantaneously below its transformation temperature, as when fibers are blown, it is possible that a large concentration of "defects" are frozen into the glass structure. That there are such changes in the glass is evidenced by changes in its physical properties as compared with the same glass composition when properly annealed, such as, lower density, higher thermal expansion, poorer durability, and the like. While the invention is not to be bound by theory, it seems possible that in the light of the present invention a chilled vitreous fiber might have more surface defects per unit of area than a crystal which had been heated to a moderate temperature, as is the case with normal catalysts.

It is also significant that two or more metal oxides are used in the present invention as represented by the described binary and ternary systems. The use of a plurality of metal oxides probably increases the range of interionic distances and bond energies. It is thought that such a surface having a plurality of oxides may offer suitable adsorption sites for a wide variety of gaseous molecules and therefore have a wider spectrum response and be more capable of oxidizing a scope of different organic compounds.

While the foregoing describes several embodiments of the present invention, it is understood that the invention may be practiced in still other forms within the scope of the following claims:

I claim:

1. An oxidation-inducing, catalytic amorphous glass consisting essentially of an amorphous base glass in highly divided form having a surface area exceeding 0.2 square meter per gram and containing in smelted admixture therewith from about 10% to about 70% by weight of an essentially binary metal oxide system, said system consisting essentially of at least 5% by weight of said glass of CuO and the balance of a metal oxide selected from the group consisting of $MnO_2$, $Cr_2O_3$, $Fe_2O_3$, CoO, NiO, $V_2O_5$, $La_2O_3$, $CeO_2$, $ZrO_2$, and admixtures thereof.

2. The catalytic amorphous glass of claim 1 in which said highly divided form is a powder.

3. The catalytic amorphous glass of claim 1 in which said highly divided form is fibrous.

4. An oxidation-inducing, catalytic, substantially amorphous glass fiber effective at temperatures within the range of about 350°F to 700°F, said fiber consisting essentially of the smelted admixture of about 10% to about 70% by weight of a metal oxide system and a balance of substantially inert, glassy amorphous material, said oxide system consisting essentially of at least 5% by weight of said fiber of CuO and the balance of a metal oxide selected from the group consisting of $MnO_2$, $Cr_2O_3$, $Fe_2O_3$, CoO, NiO, $V_2O_5$, $La_2O_3$, $CeO_2$, $ZrO_2$, and admixtures thereof, two grams of said fiber having sufficient oxidative catalytic activity to oxidize all of the CO to $CO_2$ in a supply gas consisting essentially of 1% CO, 3.75% air, balance nitrogen, at a flow rate of one liter per minute at 350°F.

5. The glass fiber of claim 4 in which said metal oxide system consists essentially in weight percent of about:

| | Percent |
|---|---|
| CuO | 25 to 80 |
| $MnO_2$ | 20 to 75 |
| Adjuvant oxide | 0 to 55 | said adjuvant oxide being selected from the group consisting of $Cr_2O_3$, $Fe_2O_3$, CoO, NiO, $V_2O_5$, $La_2O_3$, $CeO_2$, $ZrO_2$, and mixtures thereof.

6. The glass fiber of claim 4 in which said metal oxide system consists essentially in weight percent of about:

|  | Percent |
| --- | --- |
| CuO | 35 to 80 |
| $MnO_2$ | 10 to 55 |
| $Cr_2O_3$ | 10 to 32 |

7. The glass fiber of claim 4 in which said metal oxide system consists essentially in weight percent of about:

|  | Percent |
| --- | --- |
| CuO | 30 to 70 |
| $MnO_2$ | 8 to 42 |
| $Fe_2O_3$ | 19 to 60 |

8. The glass fiber of claim 4 in which there is no more than about 10% crystallinity.

9. The glass fiber of claim 4 having a metal oxide system corresponding to the enclosed area of FIG. 1.

10. The glass fiber of claim 4 having a metal oxide system corresponding to the enclosed area of FIG. 2.

* * * * *